United States Patent [19]
Braxton, Jr. et al.

[11] 3,891,449
[45] June 24, 1975

[54] MODIFIED PHOSPHAZENE FIRE RETARDANTS

[75] Inventors: Henry G. Braxton, Jr., Franklin; Margaret E. Griffing, Southfield; James G. Jolly, Lathrup Village, all of Mich.

[73] Assignee: Ethyl Corporation, Richmond, Va.

[22] Filed: Mar. 5, 1973

[21] Appl. No.: 338,145

[52] U.S. Cl. ............... 106/15 FP; 252/8.1; 260/926; 260/927 N
[51] Int. Cl. ............................................. C09d 5/18
[58] Field of Search ..... 106/15 FP; 260/926, 927 N; 252/8.1

[56] References Cited
UNITED STATES PATENTS

| | | | |
|---|---|---|---|
| 3,206,494 | 9/1965 | Lund et al. | 260/926 |
| 3,455,713 | 7/1969 | Godfrey | 252/8.1 |
| 3,505,087 | 4/1970 | Godfrey | 252/8.1 |

*Primary Examiner*—Harry Wong, Jr.
*Attorney, Agent, or Firm*—Donald L. Johnson; Robert A. Linn

[57] ABSTRACT

Modified phosphazene fire retardants are prepared by reacting an organophosphazene with either a phosphonitrilic halide or a partially substituted organophosphazene. Similar materials are made by thermal treatment of the partially substituted materials. The reactant materials contain less than 38 weight per cent cyclics and are substantially composed of linear materials such that the number average molecular weight is from about 900 to about 400,000. The products are useful as fire retardants for cellulosics.

9 Claims, No Drawings

MODIFIED PHOSPHAZENE FIRE RETARDANTS

BACKGROUND OF THE INVENTION

Various materials made from phosphonitrilic halides have been found useful for fire retardants; U.S. Pat. No. 3,455,713, 3,505,087, 3,532,526. So far as is known, materials afforded by this invention have heretofore not been described. The fire retardants of this invention have increased viscosity. Such increase can assist incorporation into cellulose fibers and textiles. Poly(dichlorophosphazene) linked by a P—O—P bond is depicted on page 138 of H. R. Allcock, *Phosphorus-Nitrogen Compounds*, Academic Press, New York, N.Y. (1972), and page 317 of J. R. Van Wazer, *Phosphorus and its Compounds*, Vol. I, Interscience Publishers, Inc., New York, N.Y. (1958).

Polymers containing P—O—P bonds, and ethoxide and phenoxide groups, but made by a process different from that afforded by this invention, are disclosed on pages 97–8 of *Chemical Week*, Feb. 20, 1965.

SUMMARY OF THE INVENTION

This invention relates to a modified phosphazene having at least two entities cross-linked by a P—O—P bond, said modified phosphazene being characterized by having less than about 38 weight per cent cyclics, and further characterized by being the reaction product formed by heating, until organic halide is evolved, a. an organophosphazene with a reactant selected from the class consisting of (b) a phosphonitrilic halide, and (c) a partially substituted, halogen containing phosphazene, each of (a), (b), and (c) being characterized by having less than about 38 weight per cent cyclics, and (b) having a number average molecular weight of from about 900 to about 400,000, and (a) and (c) being derived therefrom, each of (a), (b), and (c) having the repeating unit

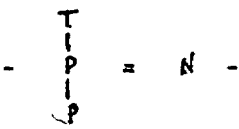

such that in
a. T is a hydrocarbyloxy radical —OR wherein R is a hydrocarbyl radical of up to about 7 carbons; in
b. T is selected from the class consisting of chlorine and bromine; and in
c. T is selected from the class consisting of chlorine and bromine and —OR wherein R is the same as above, such that from about 80–95 per cent of said T groups are —OR and the remainder is halogen; the amount of said reactant being such that the weight per cent of halogen in the reaction mixture is from about 2 to about 20 weight per cent.

This invention also relates to a modified phosphazene having at least two entities crosslinked by a P—O—P bond, said modified phosphazene being produced by heating, until an organohalide is evolved, a partially substituted organophosphazene being composed of less than about 38 weight per cent cyclics and being derived from a phosphonitrilic halide having a number average molecular weight of from about 900 to about 400,000, said partially substituted organophosphazene having the repeating unit

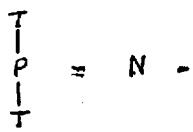

wherein T is selected from the class consisting of chlorine, bromine and —OR, wherein R is a hydrocarbyl radical of up to about 7 carbon atoms such that from about 60 to about 95 per cent of said T groups are OR and the remainder is halogen.

This invention also pertains to cellulose fibers and filamentary articles treated with a flame retardant amount of such modified phosphazenes.

This invention also relates to a method of incorporating such modified phosphazenes into cellulose filaments which comprises mixing the phosphazenes with viscose, shaping the mixture into a filament, and coagulating and regenerating the filament.

DESCRIPTION OF PREFERRED EMBODIMENTS

One way of viewing this invention is to see it based on phosphonitrilic halides, preferably phosphonitrilic chlorides. For this invention, these have less than 38 weight per cent cyclics and a number average molecular weight of from about 900 to about 400,000.

Phosphonitrilic chlorides can be produced
a. by reacting $PCl_5$ with ammonium chloride; U.S. Pat. No. 3,367,750,
b. by reacting $PCl_5$ with ammonia; U.S. Pat. No. 3,656,916,
c. by reacting ammonia with phosphorus and chlorine; U.S. Pat. No. 3,658,487,
d. by reacting phosphorus trichloride, chlorine and ammonium chloride; U.S. Pat. No. 3,359,080,
e. reaction of ammonium chloride and $PCl_5$ in the presence of certain metal salts; U.S. Pat. No. 3,407,047, 3,462,247, and
f. reaction of ammonium chloride, $PCl_3$ and $Cl_2$; U.S. Pat. No. 3,359,080.

The methods of these patents are included by reference herein as if fully set forth. Such methods can be used to prepare phosphonitrilic chlorides required for this invention. However, in its broadest aspect, this invention is independent of the means employed to prepare the phosphonitrilic chlorides.

If the product of a reaction according to the above procedures produces a mixture which does not meet the criteria of molecular weight and per cent cyclics, applicable fractions can be derived therefrom by treating the product with low boiling 30°–60°C. petroleum ether.

Undesirable cyclic materials are soluble in cyclohexane and applicable linear materials for this invention are insoluble or partially insoluble. For this treatment, ½ to 50 parts weight petroleum ether are admixed with one part by weight of phosphonitrilic chloride and mixed for 5–30 minutes at ambient temperature or thereabouts or at reflux. The resultant solution is removed.

The treatment can be repeated one of more times, if desired.

Of course, if phosphonitrilic chloride of the proper molecular weight is otherwise available, the cyclohexane treatment need not be resorted to.

As explained below, applicable phosphonitrilic chlorides can be used as reactants in the process of this invention. Alternatively, it can be transformed into other materials which can be used as reactants to form modified phosphazenes of this invention.

These other materials are (i) fully or substantially fully substituted organophosphazenes, and (ii) organophosphazenes made by reacting said phosphonitrilic chlorides with less than the stoichiometric amount of alcohol or phenol, or metal derivative of alcohol or phenol.

To react an alcohol or phenol with a phosphonitrilic chloride, one can use the procedures of U.S. Pat. No. 2,192,921, 2,586,921 or *J. Am. Chem. Soc.*, 71, 2251 (1949). Preferably, one uses an alkali metal derivative of the alcohol or phenol and reaction conditions as disclosed in those patents.

To make fully substituted phosphazenes, one uses an excess of alcohol, phenol or metal derivative thereof. A 10 per cent by weight or greater excess can be used. Even when such an excess is used the product can have up to about two weight per cent chlorine due to incomplete substitution. Such products are termed substantially fully substituted organophosphazenes.

To prepare partially substituted organophosphazenes, one uses less than a stoichiometric amount of alcohol, phenol, or alkali metal derivative thereof. Although applicable products can be made with any such lesser amount, one preferably uses 10–97 weight per cent of stoichiometric, more preferably 60–95 weight per cent, and most preferably 80–95 weight per cent of stoichiometric.

The hydrocarbyl group conferred by such process can be alkyl, cycloalkyl, aryl, alkaryl, aralkyl, etc; the configuration of the R group being non-critical. Exemplary R groups are ethyl, propyl, butyl, heptyl, phenyl, benzyl, β-phenyl ethyl and mixtures thereof.

To prepare products of this invention, reactants are heated to drive off an organic halide such as R—Cl where R is derived from —OR groups as above described, R being exemplified in the paragraph immediately above. Analogous R—Br could be evolved if phosphonitrilic bromides were involved. The evolution of organic halide results in P—O—P bond formation and can result by heating to reaction temperature:

a. partially substituted organophosphazene as above described
b. a mixture of phosphonitrilic halide and fully or substantially fully substituted organophosphazene, or
c. a mixture of fully or substantially fully substituted organophosphazene and a partially substituted organophosphazene.

For best results with (b) and (c), the reaction mixture contains from about 2–20 weight per cent chlorine; it being understood that chlorine- richer or leaner mixtures can be used.

Reaction temperatures are generally between 120° and 220°C. are used, preferably 130°–190°C. Ambient pressures, super- or subatmospheric pressures can be used; pressure being non-critical. Preferred subatmospheric pressures are 5–200 mm Hg. Reaction times of ½–120 minutes can be used. Longer times, say 3 hours or more, can be used. An inert gas atmosphere is non-critical but a nitrogen or argon atmosphere, for example, can be used if desired.

EXAMPLE

A. Various samples of phosphonitrilic chloride-toluene solution made by reacting $NH_4Cl$ and $PCl_5$ were combined and toluene removed therefrom. The wet weight of the phosphonitrilic chloride was 1502.4 grams. This was treated with approximately 1200 ml of low boiling (30°–60°C.) petroleum ether. The resultant mixture was shaken vigorously.

The petroleum ether soluble fraction was decanted.

The insolubles were subjected to distillation at 60°–70°C. using a rotary evaporator and full pump vacuum (~5–10 mm Hg). This yielded yellow, crystalline material, 858 grams.

B. Sodium propoxide was made in toluene from 303 grams of sodium and 871 grams of normal propanol (slight excess). The toluene volume was 750 ml. The phosphonitrilic chloride 816 grams in toluene (mixture 47 per cent toluene, 53 per cent $PNCl_2$) was added to the refluxing sodium propoxide-toluene mixture.

After addition was complete, the mixture was heated for 4 hours.

The crude product was treated with 50 ml $H_2O$, filtered, and the organic layer distilled at 60°–70°C. for 2 hours at full pump vacuum.

The product weight was 987 grams, the viscosity was 931.3 cs at 68°F., chlorine 1.24 weight per cent, cyclics 37.8 weight per cent and number average molecular weight 909.

C. The material was heated to 135°–139°C. for about 90 minutes. About 20 ml of propyl chloride was evolved.

The amber product analyzed as follows:

| | | |
|---|---|---|
| Wt. percent phosphorus | 20 | percent |
| Wt. percent nitrogen | 8.83 | percent |
| Wt. percent chlorine | 0.45 | percent |
| Viscosity | 825 | cs at 20°C. |
| Mol. wt. | 903 | |
| Wt. percent cyclics | 31 | percent |

Similar results are obtained by heating at 120°–220°C. a propoxy phosphazene (having 60–95 weight per cent of the T groups made from propoxy and the remainder chlorine), a phosphonitrilic chloride sample having less than 25 weight per cent cyclics, and linear polymers above 700 in molecular weight as being measured by the number average method, phosphonitrilic chloride. Similar results are obtained when the number average molecular weight is 900–400,000 and the per cent cyclics is 15 per cent.

Preferred products have 25 per cent or less and more preferred products have 15 per cent or less cyclics in the phosphonitrilic chloride and the number average molecular weight of the linears is 1000–400,000.

Similar results are obtained by reacting mixtures of the phosphonitrilic chlorides described in the paragraph immediately above with substantially fully propoxylated, ethoxylated, heptoxylated, butoxylated and phenoxylated phosphazenes prepared from such phosphonitrilic chlorides. Reaction is effected by heating said mixtures, containing 2–20 weight per cent chlorine at 120°–220°C. for 1 hour.

Similar results are obtained by reacting mixtures of substantially fully propoxylated and partially propoxylated phosphazenes prepared from phosphonitrilic chlorides of less than 25 weight per cent cyclics and having linears with a number average molecular weight of 1000–4000. The partially propoxylated phosphazenes have 60–95 weight per cent of the T groups propoxy and the remainder chlorine. The reaction mixtures contain 2-20 weight per cent chlorine and reaction temperature is 120°-220°C. Similar results are obtained when the propoxy groups are replaced with ethoxy, butoxy, heptoxy, and phenoxy groups.

The above reactions form P—O—P bonds. The products of this invention can be used as fire retardants for cellulose materials, including fibers, filaments, and fabrics.

These materials may be applied to the cellulose by dipping, spraying, or other means utilized for treating the surface. Alternatively, for rayon and other regenerated cellulosics, one or more of the materials may be impregnated or added to the product by incorporation in the viscose prior to spinning. The amount of phosphonitrilic polymer flame retardant dispersed in the regenerated cellulose will vary from about 1 to about 30 weight per cent and preferably from about 2 to about 20 weight per cent based on the weight of the filament.

For impregnation prior to spinning and the finished materials, one may proceed according to the teachings of Godfrey U.S. Pat. No. 3,455,713. That patent is incorporated by reference herein as if fully set forth. Accordingly, one method of preparing cellulose filaments and filamentary articles according to this invention is to use the flame retardants provided herein according to the method set forth in Godfrey supra. Likewise, the instant invention provides regenerated cellulose filaments and filamentary articles prepared from the flame retardants, herein provided as incorporated utilizing the techniques set forth by Godfrey.

This invention can be extended to preparation and use of materials made by the above procedures where the alkanols or polyols are substituted by halogen, e.g. chlorine and bromine. Suitable monohydric alcohols for this embodiment are made from epichloro- or epibromohydrin. Likewise, 2,3-dichloropropanol, and 2,3-dibromopropanol are suitable.

We claim:
1. A modified phosphazene having at least two entities crosslinked by a P—O—P bond, said modified phosphazene being characterized by having less than about 38 weight percent cyclics, and further characterized by being the reaction product formed by heating, until organic halide is evolved,
   a. an organophosphazene with a reactant selected from the class consisting of (b) a phosphonitrilic halide, and (c) a partially substituted, halogen-containing phosphazene, each of (a), (b), and (c) being characterized by having less than about 38 weight percent cyclics, and (b) having a number average molecular weight of from about 900 to about 400,000, and (a) and (c) being derived therefrom, each of (a), (b) and (c) having the repeating unit

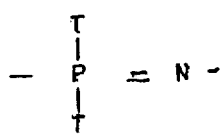

such that in
   a. each T is a hydrocarbyloxy radical —OR wherein R is a hydrocarbyl radical of up to about 7 carbons selected from the class consisting of alkyl, cycloalkyl, aryl, alkaryl and aralkyl; in
   b. each T is selected from the class consisting of chlorine and bromine; and in
   c. each T is selected from the class consisting of chlorine and bromine and —OR wherein R is the same as above, such that from about 80-95 per cent of said T groups are —OR and the remainder is halogen;

the amount of said reactant being such that the weight percent of halogen in the reaction mixture is from about 2 to about 20 weight percent.

2. A modified phosphazene of claim 1 wherein R is propyl and said halogen is chlorine.

3. Cellulose filaments and filamentary articles having a flame retardant amount of a modified phosphazene of claim 1.

4. Cellulose filaments and filamentary articles having a fire retardant amount of a modified phosphazene of claim 1.

5. A method of forming cellulose filaments and filamentary articles of claim 3, said method comprising adding said modified phosphazene to viscose, shaping the resultant mixture into a filament, and coagulating and regenerating said filament.

6. A method of claim 5 wherein R is propyl and said halogen is chlorine.

7. A modified phosphazene having at least two entities crosslinked by a P—O—P bond, said modified phosphazene being produced by heating, until an organohalide is evolved,
   a partially substituted organophosphazene being composed of less than about 38 weight per cent cyclics, and being derived from a phosphonitrilic halide having a number average molecular weight of from about 900 to about 400,000, said partially substituted organophosphazene having the repeating unit

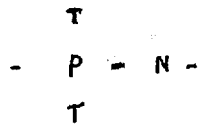

wherein T is selected from the class consisting of chlorine, bromine and —OR wherein R is a hydrocarbyl radical of up to about 7 carbon atoms selected from the class consisting of alkyl, cycloalkyl, aryl, alkaryl and aralkyl such that from about 60 to about 95 per cent of said T groups are OR and the remainder is halogen.

8. Cellulose filaments and filamentary articles having a flame retardant amount of a modified phosphazene of claim 7.

9. A method of forming cellulose filaments and filamentary articles of claim 8, said method comprising adding said modified phosphazene to glucose, shaping the mixture into a filament, and coagulating and regenerating said filament.

* * * * *